(12) United States Patent
Agg et al.

(10) Patent No.: US 7,674,080 B2
(45) Date of Patent: Mar. 9, 2010

(54) RETAINING WASHER FOR THREADED FASTENERS

(75) Inventors: Michael Agg, Bristol (GB); Michael Morrison, North Somerset (GB); Christopher Wright, Bristol (GB)

(73) Assignee: Rolls-Royce PLC, London (GB)

( * ) Notice: Subject to any disclaimer, the term of this patent is extended or adjusted under 35 U.S.C. 154(b) by 578 days.

(21) Appl. No.: 11/247,260

(22) Filed: Oct. 12, 2005

(65) Prior Publication Data

US 2007/0237601 A1    Oct. 11, 2007

(30) Foreign Application Priority Data

Oct. 14, 2004   (GB)   .................... 0422866.4

(51) Int. Cl.
*F16B 39/02*    (2006.01)
(52) U.S. Cl. .................... 411/92; 411/87; 411/121
(58) Field of Classification Search .................... 411/84, 411/85, 92, 122, 125, 121, 102
See application file for complete search history.

(56) References Cited

U.S. PATENT DOCUMENTS

| | | | | |
|---|---|---|---|---|
| 385,442 A * | 7/1888 | Burton | .................... | 411/97 |
| 682,876 A * | 9/1901 | Martin | .................... | 411/121 |
| 683,711 A * | 10/1901 | Kennedy | .................... | 40/790 |
| 845,362 A * | 2/1907 | King | .................... | 411/120 |
| 1,427,566 A * | 8/1922 | Wear et al. | .................... | 411/90 |
| 1,512,551 A | 10/1924 | McDonald | | |
| 2,381,233 A * | 8/1945 | Summers | .................... | 411/84 |
| 2,705,991 A * | 4/1955 | Reiner | .................... | 411/84 |
| 2,758,628 A * | 8/1956 | Rice | .................... | 411/87 |
| 2,968,329 A * | 1/1961 | Reiner | .................... | 411/84 |
| 3,164,191 A * | 1/1965 | Grimm et al. | .................... | 411/85 |
| 4,015,874 A | 4/1977 | Hennessy | | |
| 4,737,057 A * | 4/1988 | Olsson | .................... | 411/92 |
| 4,790,701 A * | 12/1988 | Baubles | .................... | 411/85 |
| 5,429,465 A * | 7/1995 | Puskas | .................... | 411/92 |
| 6,408,583 B1 * | 6/2002 | Hertweck | .................... | 52/334 |

FOREIGN PATENT DOCUMENTS

| | | |
|---|---|---|
| DE | 3213733 A1 | 10/1983 |
| GB | 532831 A | 1/1941 |
| GB | 2138912 A | 10/1984 |
| GB | 2 345 326 A | 7/2000 |

* cited by examiner

*Primary Examiner*—Gary Estremsky
(74) *Attorney, Agent, or Firm*—Oliff & Berridge, PLC

(57) ABSTRACT

The present invention provides a retaining washer for retaining threaded fasteners, such as bolts, that have been inadvertently loosened, in use. The invention finds particular application in gas turbine engines and in aircraft in general where wire locking of threaded fasteners has traditionally been employed. The washer (10) comprises a base member (14) having a plurality of apertures (18) each for receiving the shank of a respective bolt (20) or stud part of a threaded fastener, and engagement means (16) extending from the base member for engagement with respective bolt head or nut parts of the fasteners to retain the said head or nut parts with respect to the washer in the event of inadvertent loosening. The said engagement means is deformable between an open configuration which enables access to the bolt head or nut parts of the fasteners for tightening and/or removal thereof and a closed configuration in which the bolt head or nut part are captively retained with the washer.

17 Claims, 2 Drawing Sheets

RETAINING WASHER FOR THREADED FASTENERS

INCORPORATION BY REFERENCE

This application claims the benefit of United Kingdom Application No. 0422866.4, filed Oct. 14, 2004. The entire disclosure of the prior application is hereby incorporated by reference herein in its entirety.

This invention relates to retaining devices for retaining threaded fasteners inadvertently loosened, in use, and in particular concerns a retaining washer suitable for aerospace applications, such as aircraft gas turbine engine thrust vectoring nozzles.

In the field of aerospace engineering it is necessary to guard against the inadvertent loosening of threaded fasteners such as bolts and the like due to vibration. Traditionally bolt heads have been cross-drilled and safety wire installed to ensure that the bolts do not loosen during operation. Conventional wire locking techniques have proved to be very effective and have been widely adopted across the industry. Wire locking is now an unfavourable solution because of the high risk of injury to maintenance staff. There is a requirement therefore for a simple, cost effective and easy to use alternative that can provide the same high levels of reliability as conventional wire locking techniques.

One area in particular where there is a requirement for an alternative to wire locking is in situations where the protrusion of a loosened bolt could cause the failure of a safety critical system due to conflict of the bolt head with a moving part. For example, it is necessary to guard against inadvertent loosening of bolts in thrust vectoring nozzles such as three bearing swivel duct nozzles of the type described in GB-A-2,163,105 here a loosened bolt protruding from a flange could cause failure of the vectoring system due to conflict of the bolt head with a moving part such as an actuator mounting bracket.

According to an aspect of the invention there is provided a retaining washer for retaining threaded fasteners inadvertently loosened, in use, by relative rotation, the washer comprising a base member having a plurality of apertures each for receiving the shank of a respective bolt or stud part of a threaded fastener, and engagement means extending from the base member for engagement with respective bolt head or nut parts of the fasteners to retain the said head or nut parts with respect to the washer in the event of inadvertent loosening, wherein the said engagement means is deformable between an open configuration which enables access to the said head or nut parts of the fasteners for tightening and/or removal thereof and a closed configuration in which the said head or nut part are captively retained with the washer.

The retaining washer of the present invention readily enables nuts and bolts to be retained if inadvertently loosened, for example due to vibration. The retaining washer comprises a plurality of bolt apertures so that individual bolts, if loose, are retained by adjacent bolts, that is to say adjacent bolts are mutually retained by each other in the sense that the retaining washer is itself secured by the remaining unloosened bolt or bolts passing through it. The non-deformed open configuration of the retaining washer readily permits a spanner, socket, or other tool to be applied to the bolt head for tightening or removal of the bolts passing through the washer. In the closed configuration deformation of the engagement means against the bolt head (or nut) ensures that the bolt or the nut is captively retained with respect to the washer. In the event of inadvertent loosening of the bolt the bolt or nut is thus retained by the washer. This can prevent loosened bolts protruding into a region where damage could be caused to moving parts which come into conflict with the protruding bolt or bolts. The retaining washer can also prevent loosened nuts and bolts working free and causing secondary damage to other parts of the assembled structure.

In preferred embodiments, the washer has a generally U-shaped cross-section which defines a U-shaped elongate channel. Preferably, the base member of the washer comprises the base of the channel and the engagement means comprises one or both side portions of the channel which extend on both sides of the base to define the U-shape. In the open configuration the bolt head or nut can be readily accessed in the open region of the channel between the respective side portions for tightening or removal using a spanner or other tool. The U-section creates stiffness in the plane of the washer and this aids retention of the bolts at the end of the washer because of the cantilever stiffness properties of the washer.

The side portions are preferably bent over into the interior of the channel to provide a respective pair of opposed bolt head or nut engagement members in the interior of the channel. This provides a double-skin type structure along the sides of the washer for improved stiffness and engagement with the respective nut or bolt heads to be retained by the washer.

In preferred embodiments, the engagement members define a first section which converges from the opening of the channel towards the base member and a second section which diverges from the end of the convergent first section towards the base member. Preferably, the distal ends of the respective engagement members are adapted to engage respective flanges of the bolt head or nut parts of the fasteners to be retained. This arrangement readily enables the channel to be re-opened when a spanner is applied to the bolt head or nut after the side portions have been deformed to retain the bolt head or nut in the closed configuration of the washer. When a spanner or other tool is applied to the bolt head or nut it first comes into contact with the respective engagement members at the transition point between the first convergent section and the second divergent section where the distance between the opposing engagement members is narrowest. Movement of the spanner over the bolt head or nut then causes the engagement members to move sideways away from one another to return the washer to its open configuration so that the spanner or other tool can fully engage the bolt head or nut. As the side portions move away from the bolt head or nut the distal ends disengage from the flange of the bolt head or nut so that it is no longer held captive by the washer.

In preferred embodiments the distal ends of the engagement members are shaped, in the region of the apertures, to contact arcuate portion of the bolt head or nut flanges. The engagement members are preferably shaped to match the shape of the bolt head or nuts for improved contact when deformed to the closed configuration of the washer.

The distal ends may be serrated in the region of the apertures so that they are able to engage the torque transmission splines provided on the bolt head or nuts. In this arrangement engagement of the serrations with the splines can assist in preventing rotation of the captive nut or bolts and hence inadvertent loosening thereof.

The side portions of the washer comprising the engagement members may be cut away in the regions between adjacent apertures on one or both side of the washer such that the cut away portions define a series of engagement tabs along the side or sides of the washer adjacent to the apertures. This can reduce the weight of the washer in areas where material is not necessarily required. Alternatively the side portions may be continuous for improved stiffness.

The washer may be in the form of an elongate strip comprising two or more bolt receiving apertures. Alternatively the washer may be in the form of a ring or a series of arcuate strips that may be joined together to form a ring.

The longitudinal or circumfercial ends of the elongate strips or arcuate sections, or the circumfercial ends of a split ring washer, may be provided with overlapping joints for joining the adjacent ends together. This may be in the form of a tongue extending from one end of the strips, sections or ring, including an aperture in the tongue that is positioned in registration with the first aperture in the adjacent end to be joined so that the bolt passing through the apertures holds the adjacent ends together.

Preferably the washer is formed from a thin sheet material to provide sufficient stiffness and resilience. The thin sheet material may be a spring type steel or alloy appropriate for the specific application, for example temperature, or corrosive environment etc. The washer may be constructed of a thin sheet nickel alloy, for example Nimonic 90, stainless steel, titanium alloy etc.

In preferred embodiments the retaining washer is used for retaining nuts and/or bolts in the flanged joint between adjacent casing or section parts in a gas turbine engine casing or nozzle duct.

Various embodiments of the invention will now be more particularly described, by way of example only, with reference to the accompanying drawings, in which.

Figure 1:
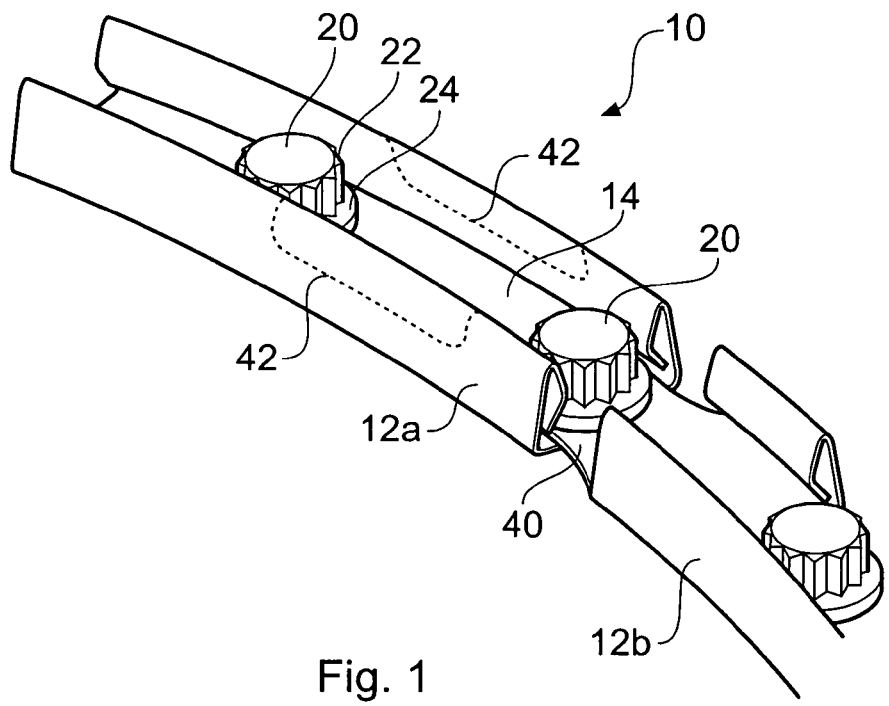
FIG. 1 is a perspective view of adjoining ends of two adjacent arcuate sections of a washer retaining ring.

Referring to FIG. 1, a bolt head/nut retaining washer 10 comprises a split ring of thin sheet material having a generally U-shaped cross-section in the plane perpendicular to the circumferential direction of the ring. In FIG. 1 only the two adjoining ends 12a and 12b of the split ring washer are shown, the remaining circumference of the ring being substantially identical to the illustrated ends. The washer of the present invention finds particular application in gas turbine engine structures such as gas turbine engine casings and nozzle ducts where cylindrical structures are joined together by bolted circumferential flanges. The washer shown in FIG. 1 may therefore be considered to be positioned around a circumferential flanged joint at the adjoining ends of, and joining together, adjacent cylindrical, or part cylindrical, aircraft gas turbine engines nozzle sections.

Figure 2:
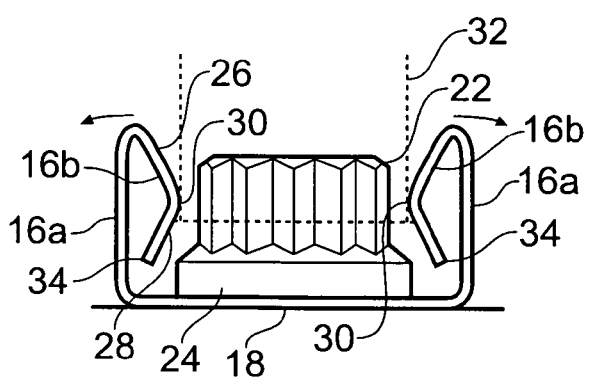
FIG. 2 is a cross-section view of the washer of FIG. 1 in the plane perpendicular to the longitudinal direction of the washer, with the washer in an open configuration.

As can be seen in FIG. 2 the washer has a generally U-shaped cross-section comprising a base member 14 and a pair of respective opposed side walls 16 upstanding from the base and defining the sides of a U-shaped cross-section channel. A plurality of apertures 18 are spaced apart in the circumferential direction of the ring for receiving the shank (not shown) of a bolt or stud threaded fastener. In FIGS. 1 to 4 only the bolt heads 20 are shown although it will be readily understood that the threaded shanks (not shown) pass through the respective apertures 18 in the base member 14 of the ring. The illustrated bolt heads 20 are of the type commonly used in aerospace applications comprising a splined bi-hex type head portion 22 for receiving a torque transmission tool such as a spanner or socket, and a flanged portion 24 which contacts the base 14 of the washer and distributes the tensile load of the bolt to the washer to clamp the washer between the bolt head and the component on the underside of the washer through which the bolts pass to join that component to another.

The sides 16 are bent upwards from the base 14 at an angle of approximately 90° to a position just beyond the top of the bolt head where they are then bent inwards into the interior of the U-shaped channel to provide a double-skin structure on both sides of the washer. The bent side walls 16 therefore each comprise an upstanding exterior part 16a and an inward facing interior part 16b. The sides are bent over initially by an angle of about 150° to the upstanding part 16a to define a first convergent section 26 converging from the top opening of the channel towards the base. The sides are then bent further by an angle of about 30° to define a second divergent section 28 which diverges in the direction from the convergent section of the channel towards the base.

The narrowest point in the channel between adjacent apexes 30 at the transition between the converging and diverging sections 26 and 28, in the open configuration of the washer shown in FIG. 2, enables the bolt head to be positioned in the washer as shown with the shank of the bolt passing through the aperture 18. In this configuration the gap between the opposing sides is sufficient to accommodate a spanner or other tool, indicated by the dashed line 32 in FIG. 2, for tightening and/or removal of the bolt from the respective aperture 18 through which it is threaded.

Figure 3:
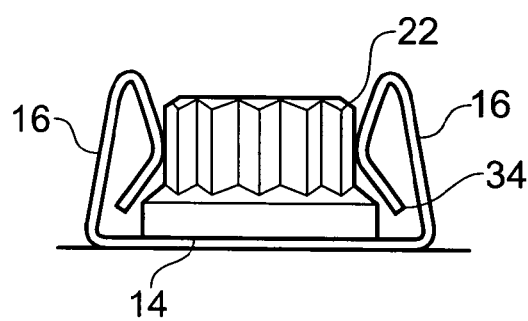
FIG. 3 is a cross-section view similar to that of FIG. 2 with the washer in a closed configuration.
Figure 4:
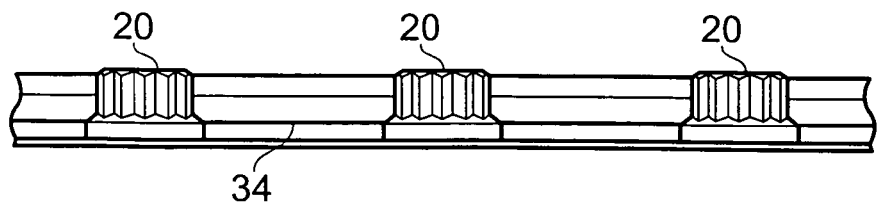
FIG. 4 is a cross-section view along the length of the washer shown in FIG. 1.

Referring now to FIG. 3, once the bolts have been tightened the side portions 16 are urged towards one another such that the distal ends 34 of the interior parts 16b of the side wall engage the top or outward facing surface of the bolt head flange 24. Elastic deformation of the side walls 16 ensures that the bolt head is retained captively within the interior region of the washer. Each of the respective bolts is therefore retained captively by the washer, and in the event of inadvertent loosening of one or more of the bolts the bolt heads remain located within the space envelope of the washer.

Removal of one or more of the bolts is effected by positioning the spanner or other bolt engagement tool over the head of the bolt such that it first contacts the convergent side portions 26 urging the sides 16 away from one another and into the open configuration of FIG. 2.

As can be seen in FIG. 1 the adjacent ends 12a and 12b of the retaining ring are joined together by means of an overlapping tongue portion 40 which extends from the circumferential end of the end section 12b. The tongue 40 comprises a bolt receiving aperture 18 (not shown) which is positioned in registration with the corresponding aperture 18 at the end of end section 12a so that both end sections are held together by the same bolt.

Although the retaining washer has been described as having a constant cross section along its length, in an alternative embodiment the side walls 16 may be partially cut away, as indicated by the dash lines 42 in FIG. 1, where the whole of the interior part 16b of the side wall is cut away between respective bolt positions, in addition to a major part of the exterior part 16a of the side walls. This is possible in embodiments where the required stiffness can be achieved with part of the side wall material between the bolt hole positions being removed.

Figure 5A:
FIG. 5a is a detailed perspective view of an alternative arrangement of the washer in the region of the bolts.
Figure 5B:
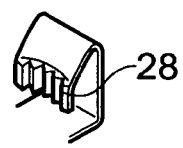
FIG. 5b is a detailed perspective view of an alternative arrangement of the washer in the region of the bolts.

In other alternative embodiments, as illustrated in FIGS. 5*a* and 5*b*, the divergent portions 28 of the interior facing side wall parts may be shaped to match the shape of the bolt heads they are to engage. For example in FIG. 5*a* the divergent side wall portions are curved in the region of the bolt heads such that the distal ends 34 engage the flange 28 at the point where the flange meets the splines. In FIG. 5*b* the side wall region 28 is serrated for engagement with the splines on the head portion 28.

Figure 6:
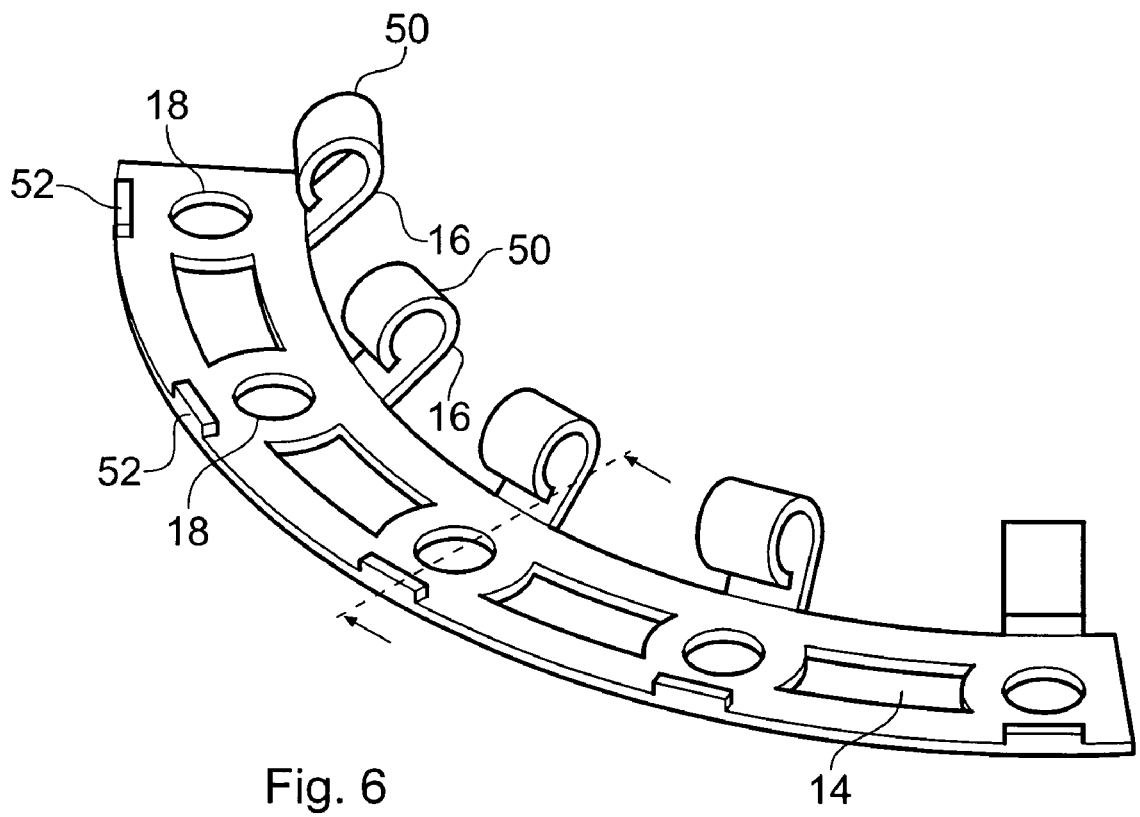
FIG. 6 is a perspective view of an alternative embodiment of the present invention having engagement means on only one side of the washer.
Figure 7:
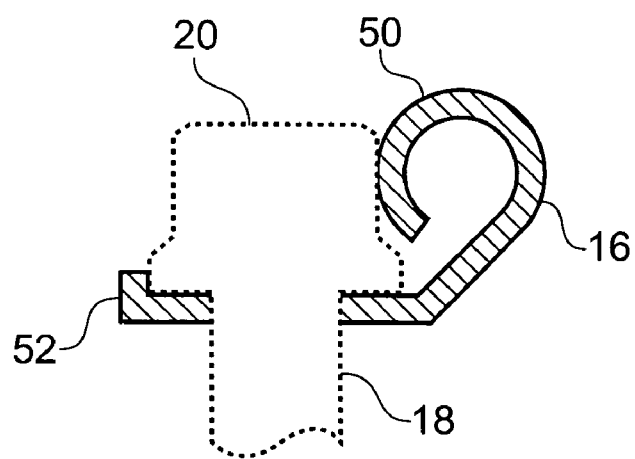
FIG. 7 is a sectional view through A-A as indicated in FIG. 6.

In another alternative embodiment, as shown in FIGS. 6 and 7, the washer is provided with side portions 16 along one edge only to form engagement means 50. A tang 52 is provided opposite each of the engagement means 50 such that, when a bolt 20 is in position in the washer (as illustrated by a dotted line in FIG. 7), the tang reacts against the force induced by the engagement means 50 and hence retains the bolt. In this embodiment the side portions 16 bend up from the base 14 and around to form an arcuate engagement means 50.

Although aspects of the invention have been described with reference to the embodiments shown in the accompanying drawings, it is to be understood that the invention is not limited to those precise embodiments and that various changes and modifications may be effected without further inventive skill and effort. For example, instead of a split ring the washer may comprises a plurality of arcuate sections which are joined together to form a ring. In other embodiments the washer may be in the form of an elongate strip. In addition, it will be understood that where the invention has been described with reference to retaining bolt heads the invention is also applicable to embodiments where the washer is used to retain nut parts of threaded fasteners.

The invention claimed is:

1. A retaining washer for retaining a bolt or a threaded fastener inadvertently loosened, in use, by relative rotation, the bolt comprising a shank and a head, the threaded fastener comprising a stud part and a nut part, the washer comprising:
    a base member having a plurality of apertures each for receiving the shank of the respective bolt or the stud part of the threaded fastener; and
    engagement means extending from the base member for engagement with the head of the bolt or the nut part of the fastener to retain the head or the nut part with respect to the washer in the event of inadvertent loosening,
    wherein the base member comprises a base of a channel and the engagement means comprises one or both side portions of the channel extending from the base,
    wherein the side portions are bent over and into an interior of the channel to provide a pair of opposed bolt head or nut engagement members in the interior of the channel, and
    wherein the engagement means define a first section distal to the base member which converges towards the base member and a second section which diverges from the end of the convergent first section towards the base member.

2. The retaining washer as claimed in claim 1, wherein the washer has a generally U-shaped cross-section defining the channel.

3. The retaining washer as claimed in claim 1, wherein the engagement means comprises at least one side portion that extends from the base.

4. The retaining washer as claimed in claim 3, wherein the side portion is bent over toward the base member to provide a bolt or nut engagement member.

5. The retaining washer as claimed in claim 1, further comprising:
    engagement members that are each adapted to engage a respective flange of the head of the bolt or the nut part of the threaded fastener to be retained by the retaining washer.

6. The retaining washer as claimed in claim 5, wherein each of the engagement members are shaped, in the region of the apertures, to contact an arcuate portion of the flanges.

7. The retaining washer as claimed in claim 5, wherein each of the engagement members are serrated, in the region of the apertures, to engage torque transmission splines provided on the head of the bolt or the nut part of the threaded fastener.

8. The retaining washer as claimed in claim 1, wherein each of the side portions are cut away in the region between adjacent apertures such that the cut away portions define a series of engagement tabs along at least one side of the washer adjacent the apertures.

9. The retaining washer as claimed in claim 1, wherein the retaining washer is in the form of an elongate strip.

10. The retaining washer as claimed in claim 1, wherein the retaining washer is in the form of a ring or series of arcuate strip sections that are joined together to form a ring.

11. The retaining washer as claimed in claim 10, wherein the washer is in the form of a split ring.

12. The retaining washer as claimed in claim 1, wherein the washer comprises a thin sheet material.

13. A gas turbine engine casing or nozzle duct comprising a flanged joint between adjacent casing or nozzle sections parts including the retaining washer as claimed in claim 1.

14. A retaining washer for retaining a bolt or a threaded fastener inadvertently loosened, in use, by relative rotation, the bolt comprising a shank and a head, the threaded fastener comprising a stud part and a nut part, the washer comprising:
    a base member having a plurality of apertures each for receiving the shank of the respective bolt or the stud part of the threaded fastener; and
    engagement means extending from the base member for engagement with the head of the bolt or the nut part of the fastener to retain the head or the nut part with respect to the washer in the event of inadvertent loosening,
    wherein the engagement means is for elastically biasing against a side of the head of the bolt or the nut part of the fastener to captively retain the head or the nut part with the washer, the engagement means elastically biasing against the side of the head of the bolt or the nut part of the fastener in a radial and downward direction relative to the axial center of the head of the bolt or the nut part of the fastener.

15. The retaining washer as claimed in claim 14, wherein the washer has a generally U-shaped cross-section defining a U-shaped channel.

16. The retaining washer as claimed in claim 15, wherein the base member comprises a base of the channel and the engagement means comprises one or both side portions of the channel extending from the base.

17. The retaining washer as claimed in claim 16, wherein the side portions are bent over and into an interior of the channel to provide a pair of opposed bolt head or nut engagement members in the interior of the channel.

* * * * *